C. C. FIELDS.
ADDING PENCIL.

No. 187,114. Patented Feb. 6, 1877.

WITNESSES:
W. W. Hollingsworth
Edw. W. Byrn

INVENTOR:
Chas. C. Fields
BY
ATTORNEYS.

UNITED STATES PATENT OFFICE.

CHARLES C. FIELDS, OF ABINGDON, ASSIGNOR TO HIMSELF AND V. DORIOT, OF WASHINGTON COUNTY, VIRGINIA, AND W. W. DAVIS AND J. M. THOMAS, OF BRISTOL, TENNESSEE.

IMPROVEMENT IN ADDING-PENCILS.

Specification forming part of Letters Patent No. 187,114, dated February 6, 1877; application filed November 16, 1876.

*To all whom it may concern:*

Be it known that I, CHARLES C. FIELDS, of Abingdon, in the county of Washington and State of Virginia, have invented a new and Improved Adding-Register for Pencils and Pen-Holders; and I do hereby declare that the following is a full, clear, and exact description of the same, reference being had to the accompanying drawing, forming part of this specification, in which—

Figure 1:
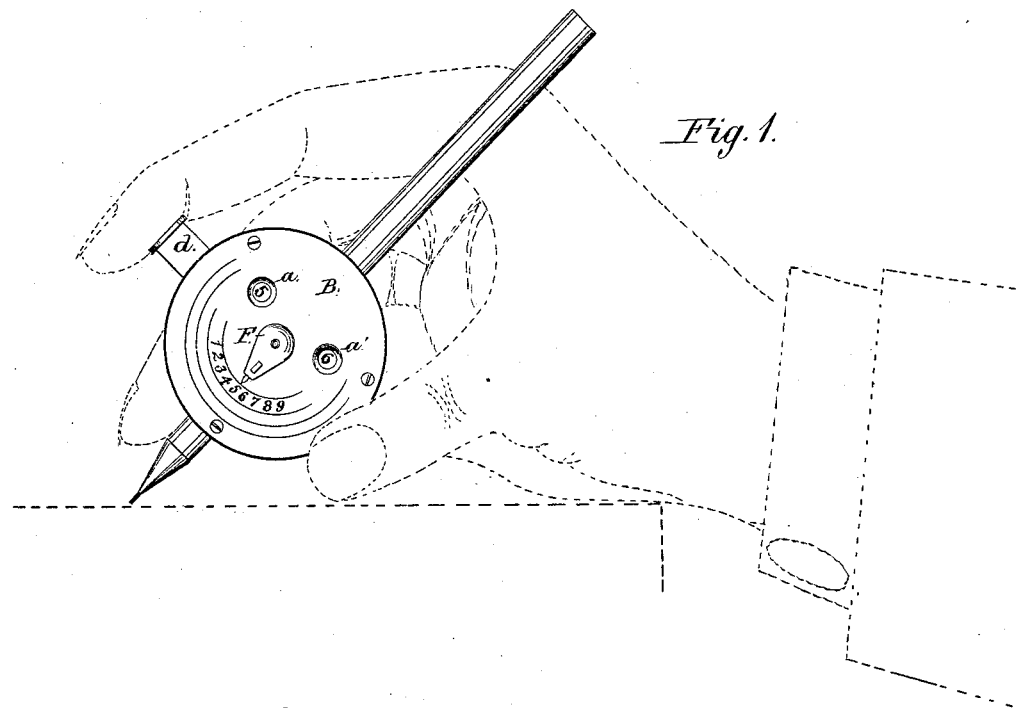
Figure 2:
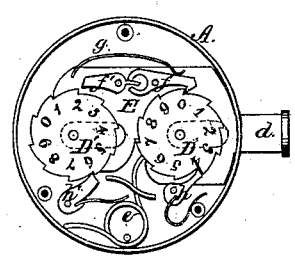
Figure 3:
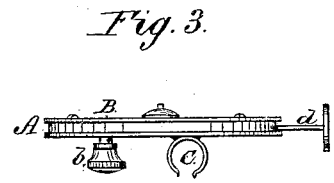
Figure 4:
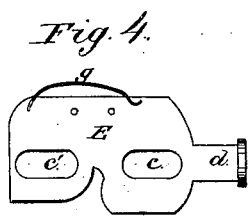

Figure 1 is a view of the device applied to a pencil, showing the position in which it is held when used. Fig. 2 is a view of the interior of the register, with the face-plate removed; Fig. 3, an edge view of the register; Fig. 4, a detail of the slide.

The object of my invention is to provide a simple and convenient registering attachment for pencils and pen-holders, to facilitate the addition of long columns of figures, the same being specially applicable for use in counting-houses, banks, schools, and offices of all kinds.

The invention relates to that class of adding devices in which nothing less than the tens are registered while the units are carried in the mind until they are raised to tens.

It consists in the particular construction and arrangement of two wheels, having ten teeth each, one of which wheels registers the tens and the other the hundreds, and each bearing numbers from 0 to 9, which successively show through apertures for the respective wheels, which latter are arranged with respect to pawls and an actuating-slide, so that one of the wheels revolves one tooth for every movement of the slide, while the motion of the other is reduced to one-tenth, to represent the hundreds, so as to move but one tooth for every ten movements or complete revolution of the "tens" wheel. The working parts of the device are compactly arranged in a case, through which projects an extension of the slide to permit the operation of the latter, and the said case is provided with a clasp for attachment to the pencil, as hereinafter more fully described.

In the accompanying drawing, A represents the case of the register, which may be of any desired shape; but is preferably of a small circular form, as shown, and is provided with a detachable face-plate, B, attached to the case by screws, hinges, or other suitable means, and has also upon its under side a clasp, C, whereby it may be attached to any pencil or pen-holder while being used. Inside of the case are arranged two wheels, D D', both of which have ten teeth, and upon their graduated faces ten figures, from 0 to 9, which, in the revolution of the wheels, successively show through apertures $a\, a'$ in the face-plate. Both these wheels are arranged upon pivots in the case, of which the pivot for the hundreds-wheel D' is extended through the side of the case and terminates in a milled head, $b$, by means of which the wheel is reset after being used. E is a sliding plate, which is slotted at $c\, c'$, which slots inclose the pivots of the wheels, so that in the reciprocation of the sliding plate they operate as guides. One side of this slide is extended through the side of the case, and is provided with a finger-piece, $d$, by means of which the slide is moved in one direction, while a spring, $e$, inside of the case serves to move it in the other.

In transmitting the motion of the slide to the wheels I have arranged upon the slide two levers, $f\, f'$. The first of these levers, $f$, is provided at one end with a hook, which engages with the teeth of the tens-wheel D, and is backed by a spring, $g$, while its other end is forked, and receives the end of lever $f'$ which loosely plays therein. In one of the teeth of the tens-wheel, also, I form a deep notch, as shown at 4 on the wheel. Now, as the slide is moved backward and forward for every such movement the hook of lever $f$ catches in a tooth of the tens-wheel and moves it one tooth, bringing a different figure into view through the aperture in the face-plate. After the tens-wheel has completed its revolution, and has recorded nine tens or ninety, the spring $g$ forces the hooked end of the lever $f$ into the deep notch at 4, and in so doing throws its forked end out, and brings the extreme or opposite end of lever $f'$ into a position to engage with the teeth of the hundreds-wheel D'. Now, when the next movement of the slide is effected it will be seen that the tens-wheel is turned to 0, and at the same time the hundreds-wheel is moved one tooth to record one hundred. For the succeeding movement of the tens-wheel the hooked end of the lever simply engages the teeth to rotate it, there being but one deep notch in its periphery to permit the engagement of the hundreds-wheel, which consequently reduces the movements of the hundreds-wheel to one-tenth that of the tens-wheel.

To prevent the backward movement of the wheels from frictional contact of the levers spring-pressed pawls $h$ $h'$ are arranged to engage with the teeth and hold the wheels to their positions.

In making use of the improved adding-register, as thus described, it is slided onto the pen or pencil into a position near the point of the same, and is there held by the clasp with the forefinger resting upon piece $d$, as shown in Fig. 1. Now, in adding up a column of figures the tens are counted and recorded by a pressure upon the piece $d$ with the finger, while the units are carried. Thus, if 6 7 8 are three successive figures of the row—6 and 7 make 13—the 10 is registered by a pressure of the finger, and the 3 is carried to the 8, making 11, for which the 10 is registered by a similar pressure, and the 1 carried, and so on, the same principle applying to the higher denominations. After having added up a row, the number of units is set down at the foot of the column, and the amount indicated by the register carried to the next column. If, however, in the addition of a column of figures the accountant is interrupted, or if for any reason it becomes necessary to register the units, this may be done until the work is resumed by simply marking the place at which the interruption occurred, and setting a pointer, F, on the dial-face to the proper one of a set of digits, which indicates the number of units to be carried. Thus, in Fig. 1, supposing the register to have been laid aside from an interruption and just taken up again, it would indicate a record of 6.50 with 5 to be carried.

Having thus described my invention, what I claim as new is—

1. The combination, with the toothed and numbered wheels $D$ $D'$, of a sliding plate, carrying devices for operating the wheels, and having slots $c$ $c'$, which inclose and utilize the pivots of the said wheels for guides, substantially as and for the purpose described.

2. The wheel $D$ having ten teeth, and one notch deeper than the others, and the wheel $D'$ having ten teeth and an extended pivot, and both provided with suitable detents, in combination with the slide E extended through the side of the case, a spring, $e$, and the levers $f$ $f'$, arranged to operate the hundreds-wheel once for every ten movements of the tens-wheel, substantially as described.

The above specification of my invention signed by me this 15th day of November, 1876.

CHARLES C. FIELDS.

Witnesses:
 EDWD. W. BYRN,
 SOLON C. KEMON.